United States Patent [19]

Comer

[11] B 4,129,977

[45] Dec. 19, 1978

[54] LOW SPEED ROTARY MOWER

[75] Inventor: Robert C. Comer, Hopkins, Minn.

[73] Assignee: The Toro Company, Minneapolis, Minn.

[21] Appl. No.: 494,167

[22] Filed: Aug. 2, 1974

[44] Published under the second Trial Voluntary Protest Program on Mar. 23, 1976 as document No. B 494,167.

[51] Int. Cl.$^2$ .......................................... A01D 35/262
[52] U.S. Cl. ...................... 56/13.4; 56/295; 56/320.2
[58] Field of Search ............... 56/16.6, 320.1, 320.2, 56/255, 295, 13.4, 202

[56] References Cited

U.S. PATENT DOCUMENTS

| | | | |
|---|---|---|---|
| 2,942,396 | 6/1960 | Farnam | 56/320.2 X |
| 2,969,634 | 1/1961 | Lannert | 56/295 |
| 3,050,924 | 8/1962 | West | 56/295 |
| 3,220,170 | 11/1965 | Smith et al. | 56/295 X |
| 3,321,894 | 5/1967 | Ingram | 56/295 |
| 3,568,421 | 3/1971 | Smith et al. | 56/320.2 X |
| 3,601,960 | 8/1971 | Buechler | 56/320.2 |
| 3,888,072 | 6/1975 | Templeton | 56/320.2 |

Primary Examiner—J. N. Eskovitz
Attorney, Agent, or Firm—Merchant, Gould, Smith, Edell, Welter & Schmidt

[57] ABSTRACT

A rotary mower in which grass cutting and collection of cut grass particles is achieved with a relatively low blade tip speed. A cutting blade is mounted for rotation about a vertical axis within the symmetrical expansion type mower housing in which the expansion top wall has a substantial rise to a discharge opening vertically above the cutting blade. The housing has a continuous exterior side wall surrounding the cutting blades and extending above the sail portion thereof. The sail portions of the blade trailing the cutting edges have substantial inward and upward rake angles which result in combined mechanically throwing of the grass and a pumping effect results from the housing and blade configuration.

12 Claims, 9 Drawing Figures

U.S. Patent  Dec. 19, 1978  Sheet 1 of 2  4,129,977
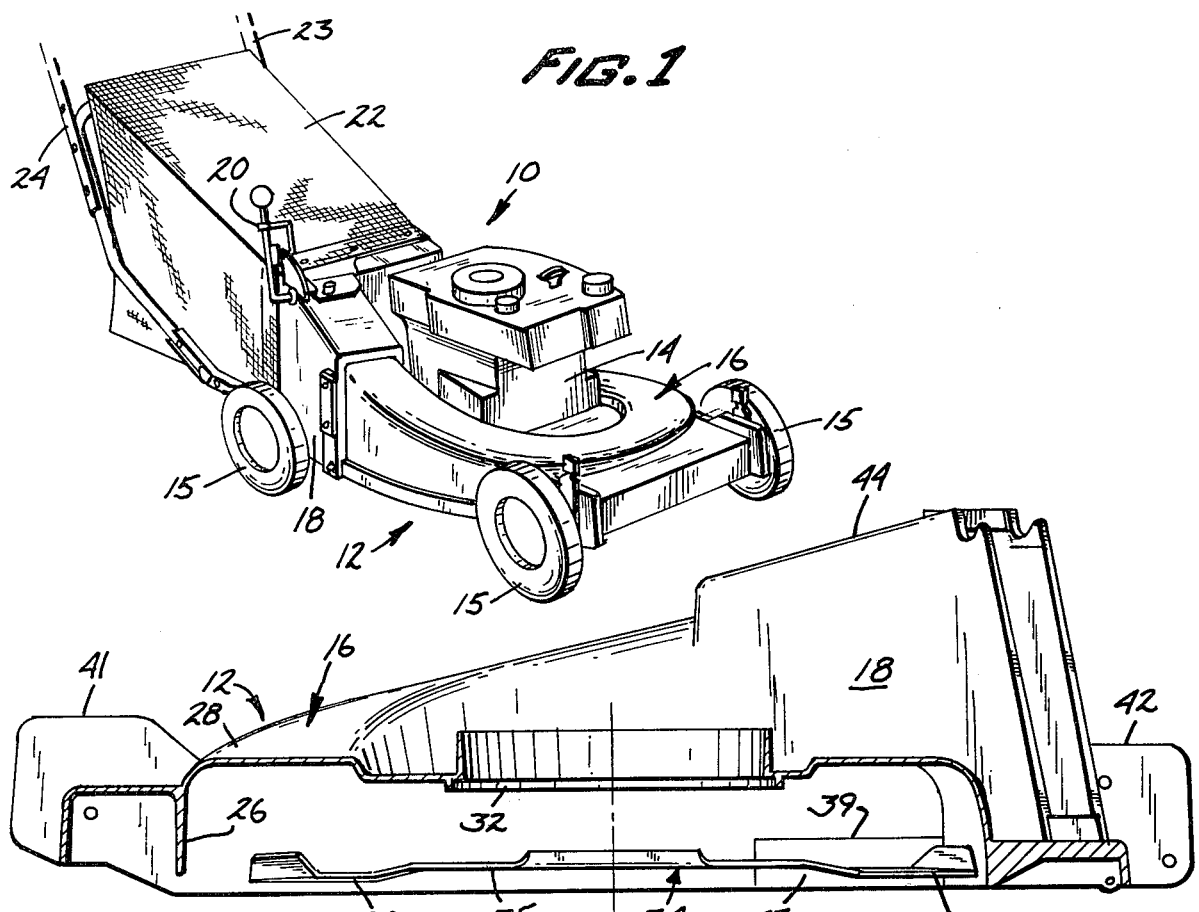
FIG. 1
FIG. 2
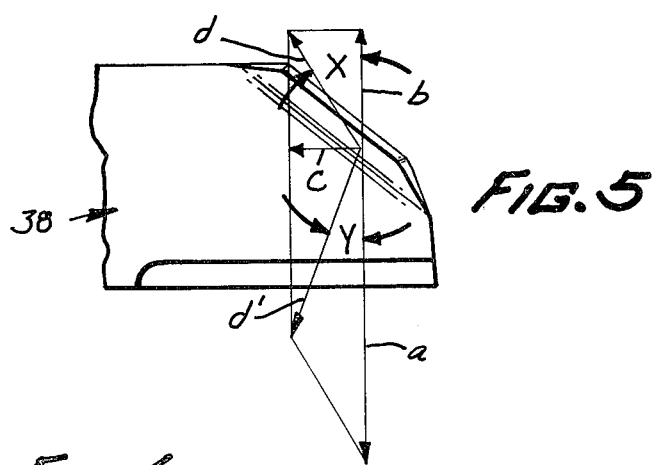
FIG. 5
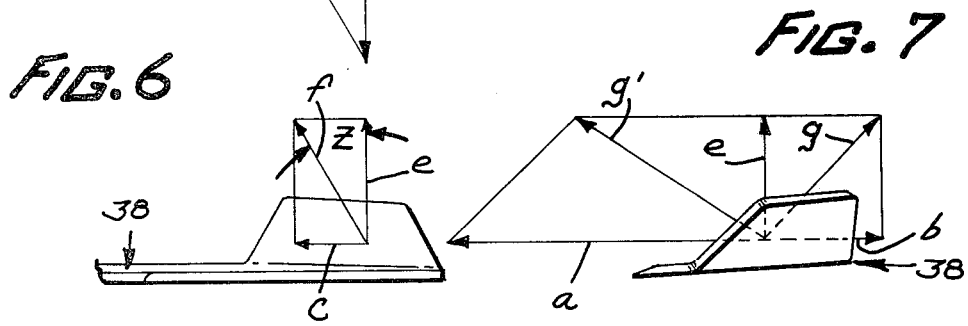
FIG. 6
FIG. 7

LOW SPEED ROTARY MOWER

BACKGROUND OF THE INVENTION

This invention relates generally to lawn mowing equipment and more particularly concerns an improved rotary lawn mower of the type in which a cutting blade is mounted for rotation about a vertical axis within a housing which substantially encloses the blade.

Rotary lawn mowers function by impact cutting of blades of grass, that is, by driving the cutting edge to impact the blades of grass at such a substantial velocity that the blades cut cleanly by the cutting edge before individual grass blades may bend out of the cutting plane. This distinguishes the mowing concept from that of a reel type mower, where blades of grass are cut by means of a pair of cutting edges which operate against one another.

It has been known for some time that impact cutting of grass of various varieties and in varying moisture and toughness conditions may be cleanly made at cutting edge or tip speeds as low as 5,000 feet per minute (FPM). Despite this knowledge, many prior art mowers have been constructed to operate with their cutting edges moving at a speed of as much as 20,000 FPM. The primary reason for the high blade velocities is it is desirable to have a lawn mower which will impart sufficient momentum to the cut particles so that they may be collected in a porous bag or other receptacle connected to a discharge opening in the mower housing.

Unfortunately, driving the cutting blade at such high speeds results in substantial noise generation by the engine used to drive the blade and from interaction of the driven blade and mower housing. Driving the blade of a rotary mower at high tip speeds in the range of 20,000 FPM also means that when the blade contacts foreign objects such as stones, wires, or other harder-than-grass debris on the lawn, it is possible to impart sufficient momentum to the debris to cause them to become hazardous projectiles. Since the kinetic energy available for transfer to the foreign objects increases with the square of velocity, it is highly desirable to operate at a lower velocity.

Despite the shortcomings of rotary mowers having blades which are driven at relatively high speeds, mowers available to the consuming public have typically operated at such high blade speeds because of the significant difficulty of constructing a low speed mower which would bag its cut grass particles. With increased emphasis on safety considerations and sources of noise pollution, there has been corresponding concentration on the problem of constructing a quieter mower with a blade operating at a lower speed without sacrificing other performance features felt to be convenient and desirable by the user, but the problem has not been satisfactorily solved.

The present invention provides a solution to these problems. It is a mower in which a substantially lower blade tip speed is used, yet bagging is achieved, even in embodiments using rear discharge openings, which, as is well known to those of skill in the art, is considerably more difficult than bagging using a side discharge opening. This is true because cutting of grass occurs in the front two quadrants of blade rotation. Therefore, grass must be transported a significantly greater distance for rear than for side discharge. The improved rotary mower of the present invention provides momentum to cut grass particles by means of upward, inward mechanical throwing of cut particles by its trailing sail portions in combination with an axial flow pump effect providing a controlled upward flow of air from the cutting region. Use of an upwardly, inwardly raked sail driven at a relatively low tip speed in contrast to previous machines results in a combined mechanical throwing and fluid pumping action which transports cut grass particles into the expansion channel of the housing.

This appears to be an entirely different concept of cut particle transport than the very common transport method in which grass particles are cut and thrown essentially tangentially outward to the side wall of the housing where the air turbulence generated by the blade and sail portions thereof transport grass angularly around the side wall to a discharge opening therein.

SUMMARY OF THE INVENTION

In accordance with the invention, a cutting blade is mounted for rotation about a substantially vertical axis. The cutting blade has a pair of cutting tips at opposite ends. Each tip includes a leading cutting edge, a body and a following trailing sail portion. The sail portions of the cutting blade have a substantial upward and inward rake angle. The cutting blade is mounted within a mower housing having an expansion or channel portion with a top wall having a significant rise between the front two quadrants of the housing. The housing has a substantially continuous exterior side wall surrounding the blade at the height thereof and extending above the sail portion. The mower discharge opening is located vertically above a portion of this side wall. Means for driving the cutting blade rotatably at a tip speed in the range of 5,000 to 14,000 feet per minute, such as an internal combustion engine, are provided. Means such as wheels mounted on the housing enable movement of the housing and enclosed blade over the lawn surface at a controlled height above it. A grass-catching bag may also be attached to the discharge opening for collection of grass clippings therein.

It has been found that, in obtaining effective operation, it is highly desirable to maintain certain sail parameters within established ranges. For example, the trailing sail portion preferably has an upward rake angle between 18° and 35°, the upward rake angle being measured between the front surface of the sail and the line perpendicular to the cutting plane defined by rotation of the cutting edges about the rotational axis of the blade. This provides the proper upward mechanical throwing action. In addition, it is important to maintain a mechanical throwing action which is inward rather than tangential to blade rotation. A preferred range of inward rake angles, that is the angles between the sail portions and a line parallel to a radial line from the axis of blade rotation has been established. This range is from 25° to 60°.

As previously mentioned, it is particularly difficult to achieve a rear discharge bagging type mower. Therefore, it is an important achievement of the present invention that it is possible to construct a rear discharge bagging mower having a blade which rotates at a relatively low cutting edge speed. In certain rear discharge opening embodiments of the present invention, the mower cutting blade may be so mounted with respect to the housing that, in the rear two quadrants of blade rotation, the blade tip clearance between the housing side wall and the blade tip is at a maximum of 3/16 inch. This tends to prevent clippings which may not exit the housing in the initial contact and transport from the blade from being dropped to the lawn surface at the rear of the mower and enables them to be carried through another revolution for subsequent discharge.

BRIEF DESCRIPTION OF THE DRAWINGS

Other objects and advantages of the invention will become apparent upon a reading of the following detailed description and upon reference to the drawings showing specific embodiments of the invention. Referring particularly to the drawings, wherein the use of like reference numerals throughout the several views denotes like elements:

FIG. 1 is a perspective view of a rear discharge rotary mower constructed in accordance with the present invention, the handle portion thereof being partially cut away;

FIG. 2 is a sectional view vertically through the center of the housing of the mower of FIG. 1, with a blade mounted therein to show the position of the blade with respect to the housing and rear discharge opening;

FIGS. 5, 6 and 7 are plan, elevational and side views respectively of cutting tips of the blade of FIGS. 2, 3 and 4 with vector diagrams thereon for the purpose of illustrating and explaining the mechanism of operation of the trailing sail portions of a mower constructed according to the present invention;

Figure 8:
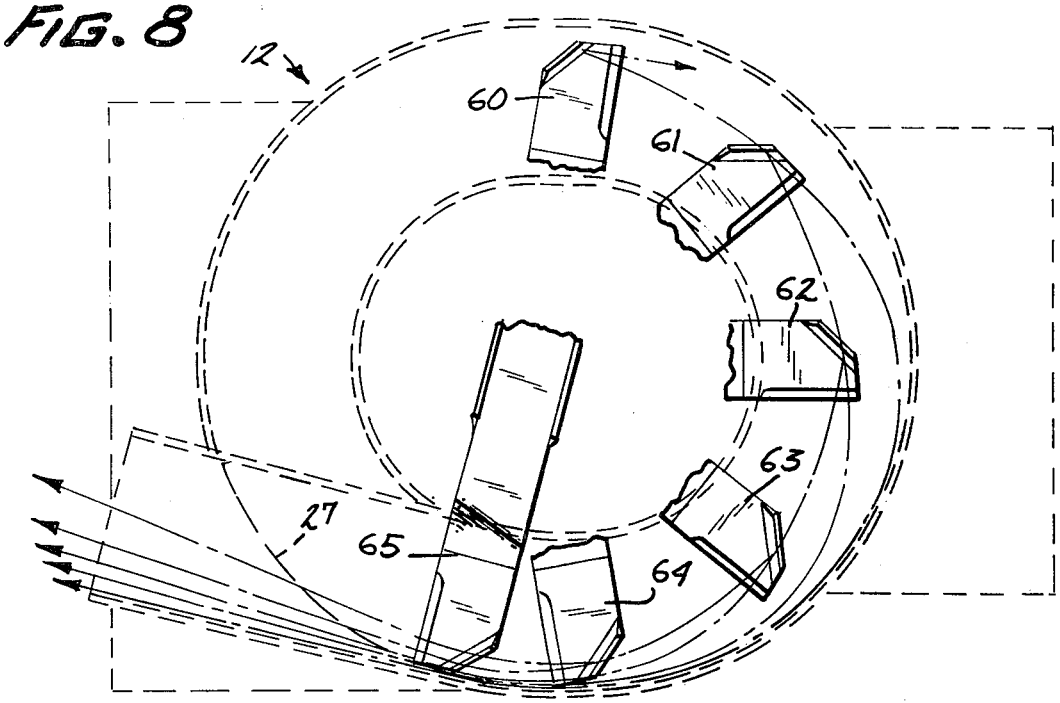
FIG. 8 is a plan view showing the housing of the mower of the present invention in dotted line form and portions of a cutting tip in successive positions about the housing for the purpose of discussion of particle trajectories followed by the clipped grass impacted and thrown by the cutting blade.

While the invention will now be described in connection with specific embodiments, it should be clear the invention is not limited in scope to those embodiments. On the contrary, all alternatives, modifications and equivalents included within the spirit and scope of the invention as defined by the appended claims are covered.

DETAILED DESCRIPTION OF THE INVENTION

In FIG. 1, a rear bagging rotary lawn mower generally designated 10 is shown in perspective, a portion of an operator handle therefore being cut away since it is not essential to the invention. Rear bagging rotary lawn mower 10 has a mower housing 12 to which other mower elements may be attached. Mower housing 12 substantially surrounds and encloses a cutting blade (not shown in FIG. 1) which is driven about a vertical axis by an internal combustion engine 14.

Housing 12 has mounted thereon front and rear wheels 15 which, by their height with respect to the housing, control the height and inclination of the cutting blade, as is typical in modern rotary lawn mowers. Front and rear wheels 15 may be fastened so that the axis of rotation of the blade, although perpendicular to certain housing surfaces, will not be quite perpendicular to the ground surface. Normally, the wheel mouting will be such that housing 12 and the cutting plane will be slightly closer to the ground surface in the front of the mower than in the rear. The purpose of this is twofold. First, the amount of power needed to drive the blade is decreased since contact with the grass occurs only in the front two quadrants of the circle swept out by the cutting blade. Second, because the blade is higher in the rear two quadrants it should not contact nor bruise the cut grass tips, which would cause undesirable and unsightly browning of the grass top edges.

Housing 12 has a symmetrical channel or expansion 16 of essentially uniform width but with a top wall thereof of gradually increasing height. The top wall of expansion or channel 16 in the particular embodiment shown in FIG. 1 is essentially a circular helix form which terminates in a discharge chute or opening 18, the outer surfaces of which are shown in FIG. 1. While it is not essential that the expansion 16 be of circular helix form, it is significant that there is a substantial rise of the expansion portion between the cutting region and the discharge opening.

Discharge chute 18 has mounted therein a pivotable arm 20 to which is attached a discharge closure door (not shown) located interior of chute 18. This discharge closure may be used to close the discharge for use of the mower in a mulching mode or as a safety feature in the event the mower is started with its grass-catching receptacle removed. Attached to discharge opening is a clipping receptacle 22 which may be a grass-catching bag of a woven porous fabric. Also shown in FIG. 1 is an operator handle 23 with a cross brace 24 attached thereto against which the back of grass-catching bag 22 may rest, particularly in embodiments which use a bag with a reinforced top frame.

FIG. 2 shows a vertical section taken through housing 12 along a plane parallel to the intended direction of travel through the center of the mower. An unsectioned cutting blade is placed in the sectionally shown housing to illustrate the relative blade and housing positions in the embodiment being described. Mower housing 12 includes an exterior side wall 26, substantially vertical in extent and, in the embodiment shown, circularly cylindrical in form, which surrounds and provides a horizontal enclosure for the cutting blade.

In the housing of FIG. 2, a discharge insert 27 provides continuity to the exterior side wall at the level of the cutting blade so that the lower section of side wall 26 in the particular embodiment shown, is substantially a complete circular cylinder. It is important to the present invention that the housing be substantially enclosed in the cutting region, but it should be apparent that it is not necessary that this be accomplished with an insert. It may be possible to mold housing 12 so that the insert structure is an integral part thereof or achieve required minimum clearances between blade and housing in yet another way.

Continuing with description of the features of the specific embodiment of housing 12 shown, housing 12 has, connected to exterior side wall 26 by means of a rounded but substantially right angle portion, a channel or expansion top wall 28. Expansion top wall 28 is configured with a substantial vertical rise which occurs in its 360° of angular extent above the housing, so that the vertical height of expansion top wall 28 proximate the discharge opening above the portion of wall 28 where the expansion commences is considerably higher than is typically encountered.

For example, expansion top wall 28, in an embodiment recently constructed, had an angular rise of approximately 20° and a vertical rise of somewhat over 6 inches in its excursion about the mower housing.

On the opposite or inner side of the expansion or channel portion which defines an upward circular helix from the substantially cylindrical cutting region of the housing is an inner expansion side wall 29 which generally follows the expansion top wall and increases in its height to provide continuity between expansion top wall 28 and a substantially planar housing inner top wall 30 located centrally of the mower. Housing inner top wall 30 is generally a circular plate in form with a motor mounting wall 32 rearwardly offset from the center thereof. A vertical axis is represented by a vertical center line extending downward from motor mounting wall 32. This represents a rotational axis of a mower cutting blade 34 mounted to the drive shaft of an engine (not shown for clarity of representation).

Referring now particularly to cutting blade 34, it will be noted that cutting blade 34 is mounted offset with respect to the center of the chamber defined by side wall 26, insert 27 and the elements 28, 29, 30 and 32 which define the top wall of the housing. It is not essential to the present invention that such offset mounting occur. However, it has been found preferable that, in the rear two quadrants of blade rotation, there be a sufficiently small clearance between the blade and the housing to create a substantial pumping effect and to prevent grass cuttings and other debris from collecting on the rear wall and sliding downward therefrom to cause unsightly accumulation on the lawn. It has been found with the cutting edge speeds used, that is, in the range of 5,000 to 14,000 FPM, that it is preferable to maintain a tip to side wall clearance less than 3/16 inch in the rear two quadrants of blade rotation.

Cutting blade 34 includes a central portion 35 having upwardly extending flanges 36 for engagement with a blade retainer element or other drive means. Angularly discontinuous from central portion 35 are a pair of cutting tips 38 at opposite ends of blade 34. Cutting tips 38 are mounted lower than central portion 35 to reduce the power required to drive the mower. If the entire blade were substantially planar, so that the cutting edge was at the same level as the remainder of the blade, much more contact between blade and grass would instantaneously occur. Such contact would create additional drag without providing additional performance.

As previously mentioned, expansion top wall 28 extends around the housing 12, preferably in a circular helix form, to a discharge opening. In the sectional view of FIG. 2, a portion of the discharge opening is visible at the interior of the housing. A discharge opening bottom edge 39, which is the top of the vertical wall of discharge insert 27, defines the bottom of the discharge area. An important aspect of the present invention is that the discharge opening is completely away from, in this case above, the cutting region.

Additional features of the housing 12 shown in FIG. 2 include front and rear wheel mounting flanges 41 and 42 respectively and a recessed portion for a discharge closure or door 44 which in the figure appears as a discontinuous extension of expansion top wall 28.

In viewing the discharge opening of housing 12 it should be particularly noted that the vertical dimension of the opening exceeds the width dimension. It is important to the present invention that there be substantial area available for the discharge opening. As an example, in one particular embodiment of the present invention which has been constructed, the height of the opening was approximately 8 inches and the width thereof was approximately 4.75 inches. It is also important to effective collection in that the clippings be lifted and carried upward and away from the cutting region rather than forced therefrom by a tremendous expenditure of power with its attendant high blade speed requirement.

Figure 3:
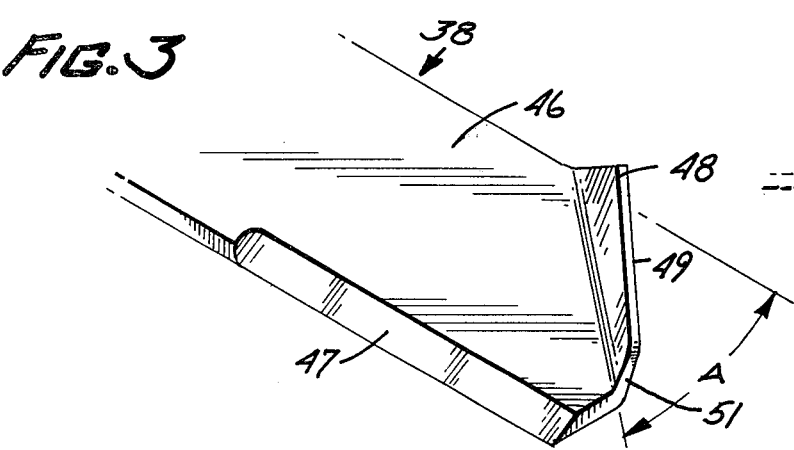
FIG. 3 is a perspective view of a cutting tip of a blade constructed according to an embodiment of the present invention, particularly illustrating an important angle defining a sail parameter.

Moving now to discussion of FIG. 3, there is shown an enlarged perspective view of one of cutting tips 38 of the rotary mower blade. Each cutting tip 38 has a body portion 46 with a beveled leading or cutting edge 47 which is, of course, the lowest point on the blade, with body 46 being slightly higher so that only the cutting edges define a cutting plane and bruising of the grass does not result because there is no additional contact between the blade body and grass tips. Located rearwardly of beveled cutting edge 47 is a trailing sail portion 48, in the embodiment shown generally trapezoidal in form with a planar front surface. Trailing sail portion 48 may be constructed on a portion of blade material formed upwardly with respect to body 46. Trailing sail 48 has a sail exterior edge 51 and upper edge 49. The front surface of sail 48 in the embodiment shown is substantially planar and has a substantial inward rake with respect to a line parallel to a radial line from the axis of rotation of the blade.

Although the exact theory of operation of the present invention to provide low speed cutting and bagging discharge of cut grass particles is not rigorously defined, it is known that the inward rake angle identified as angle A in FIG. 3 is an important parameter to be controlled in construction of a mower which operates in accord with the present invention. The inward rake angle A is defined as the angle between a line parallel to a radial line and a line defined by intersection of the front surface of sail 48 and either the cutting plane or body portion of the tip. Experimentation with inward rake angles of varied amount has shown that a substantial inward rake angle is necessary to provide the inward momentum to cut grass particles necessary to prevent the particles from being tangentially thrown to adhere to the exterior side wall of the housing.

At this point, the range of preferred speeds for the cutting edges of blades on mowers of the present invention will be briefly discussed. This range of preferred velocities is from a minimum of 5,000 feet per minute to a maximum of 14,000 feet per minute. Below 5,000 feet per minute, there is not sufficient momentum and fluid flow to clear the grass from the cutting edge. On the other hand, above 14,000 feet per minute, the substantial upward and inward rake of the sail, designed to provide predominantly mechanical suspension and transport rather than pneumatic transport, tends to over-pressurize the housing and cause mower "blowout", with entrained air (and clippings) being driven out around the lower edges of the housing rather than channeled into the bag. In addition, the high speeds will result in undue turbulence within the housing.

Unlike conventional high blade speed mowers which rely almost exclusively on pneumatic suspension and transport of cut grass particles, the present invention suspends the cut grass particles and provides initial transport of the particles predominantly by a mechanical throwing effect using the sail surfaces. This makes sail parameters extremely important. For example, it has been determined that the inward rake angle A shown in FIG. 3 should preferably be somewhere in the range of 25° to 60°. Below 25° of inward rake, the discharge stream has too great a radial component, causing grass buildup on the housing side wall. The 60° upper limit for the inward rake angle occurs because at angular velocities within the working range, an angle greater than 60° results in undue turbulence, creates high chamber pressures, and due to over-agitation of the lawn surface, results in poor cuts. As would be expected, it also consumes large amounts of power.

Since the front surface of the trailing sail is used in a mechanical throwing action, it is also important that the sail have a substantial vertical height above the body portion, and sufficient front surface area to provide an effective impact surface. It is preferable that the sails have a vertical height above the body of the cutting tips of at least one-half inch. As an example, in a specific blade recently constructed, the sail portions were approximately 2.5 inches long and 0.62 inches in vertical height above the body.

Figure 4:
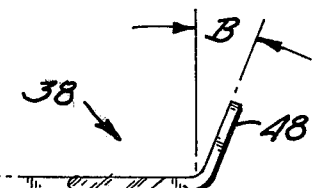
FIG. 4 is a view of a portion of the cutting tip of FIG. 3 taken perpendicular to the front surface of the sail portion to particularly illustrate a second important angle.

FIG. 4 is another view of a portion of cutting tip 38 taken perpendicular to the front surface of trailing sail portion 48 to aid in definition of a preferred range of angles of upward rake of trailing sail 48. In that figure, cutting edge 47, sail exterior edge 51 and trailing sail portion 48 are shown. An angle B shown in FIG. 4 is defined as the angle between the front surface of trailing sail portion 48 and a line perpendicular to the cutting plane. For purposes of this specification, this will be referred to as the upward rake angle of the trailing sail. A preferred range for this upward rake angle B has been established empirically by tests of different types of trailing sails. It has been found preferable to select the upward rake angle within the range of 18° to 35°. Experimentation has shown that angles less than 18° result in too low a component of upward momentum transmitted to the grass particles. Therefore they are not readily suspended and transported upward from the cutting region to the expansion or channel portion of the housing. This complicates discharge into a bagging receptacle. To better understand the invention, one should realize that the grass particles impact and rebound from the trailing sail portion. If the particles' angle of incidence is not sufficiently large (a small upward rake angle), the particles will tend to rebound and remain within the cutting region. On the other hand, if the angle is too great, say greater than 35° a substantial number of clippings will tend to slide over the trailing sail portion without receiving substantial upward momentum or mechanical throw therefrom. Thus, in both cases, angles outside the range of recommended upward rake angle B result in a lowering of the discharge stream created by the mechanical throwing action of the sail.

FIGS. 5, 6 and 7 are vector diagrams showing a cutting tip 38 in plan, front and side views respectively for purposes of discussion of components of velocity imparted to cut grass particles and debris by the trailing sail portion of a blade constructed according to the present invention. In these figures, the velocity-representing vectors are identified with lower case letters with certain important angles between these velocity vectors identified with upper case letters.

While the vectors shown represent relationships for a specific embodiment of the present invention, they are helpful in understanding the concepts underlying the present invention. In the specific embodiment on which the diagrams are based, a 19 inch blade was used and driven at approximately 2,100 RPM so that at a point somewhat inward of the tip velocities were in the vicinity of 10,500 feet per minute, approximately midway in the range of 5,000 to 14,000 feet per minute for which the mower has been developed. The trailing sail portion shown in FIGS. 5, 6 and 7 has an inward rake angle of approximately 40° and an upward rake angle of approximately 20°.

The vectors radiate outward from a representative point on the trailing sail portion of the cutting tip. A vector a extends perpendicular to the cutting edge of the blade and represents the velocity of the blade with respect to the mower at that radius. Since the blade is rotating about an axis, the instantaneous velocity is directed perpendicularly to a radial line from the blade axis of rotation. Erect blades of grass are impacted by the cutting edge of the blade and severed thereby. As a result of this impact, they gain some slight amount of forward momentum. However, they tend to slide back along the body of the cutting tip until they contact the front surface of the trailing sail portion. At this point they impact the front surface and acquire substantial additional forward momentum. Because the collision is not perfectly elastic, the cut grass particles and debris will not acquire the same tangential component of velocity as the blade itself. Therefore with respect to the blade they will have a component of rearward velocity, represented in FIGS. 5 and 7 by vector $b$.

Due to the substantial inward rake of the trailing sail's front surface, clippings which impact the front surface will also attain a substantial inward component of velocity represented in FIGS. 5 and 6 as vector $c$ and directed perpendicular to vectors $b$ and $a$. This inward velocity is a direct result of the mechanical throwing action and inward rake angle of the trailing sail portion. The resultant rearward and upward velocity of the grass, the sum of vectors $b$ and $c$, is identified as vector $d$ in FIG. 5 and has an angle X with respect to vector $b$ or a tangential line.

For the specific embodiment described and specified above, the angle X which describes the movement of grass particles upward and inward along the sail has been measured at 30° to 35° experimentally. Thus, there is a very substantial inward component of velocity imparted to the grass by mechanical throwing action of the inwardly raked sail.

Vectors $b$, $c$ and $d$ all represent velocities with respect to the blade. The grass particles will, of course, actually be moving in the same direction as the blade with respect to the mower or ground surface. The velocity of the grass with respect to the mower itself is represented by vector $d'$, the sum of vector $d$ and vector $a$, the velocity of the blade with respect to the mower. The angle between vectors $a$ and $d'$ or the angle of inward throw of grass particles with respect to the housing is identified as angle Y in FIG. 5. For the embodiment with the specific parameters previously described, this inward throw angle will be approximately 20°.

Due to the upward rake angle of the sail there will be a substantial upward component of grass velocity which brings the grass clippings into the expansion channel where they may be easily transported outward to the discharge opening. Vector $e$ in FIG. 6 represents this upward component of velocity. It is substantially equal to the rearward component of velocity $b$ in magnitude but directed perpendicular thereto. Therefore the resultant upward and inward velocity, vector $f$, which is the sum of vectors $e$ and $c$, is at an angle Z to the perpendicular and angle Z is substantially equal in magnitude to angle X.

FIG. 7 shows a side view of cutting tip 38 so that the resultant upward and rearward velocity with respect to the blade, labeled vector $g$, may be combined with the velocity of the blade with respect to the mower to give vector $g$. This illustrates the substantial upward throw with respect to the housing mechanically throwing clippings into the expansion or channel portion of the area where it may be aided by the pneumatic transport effect of the housing and rotating blade combination.

Figure 9:
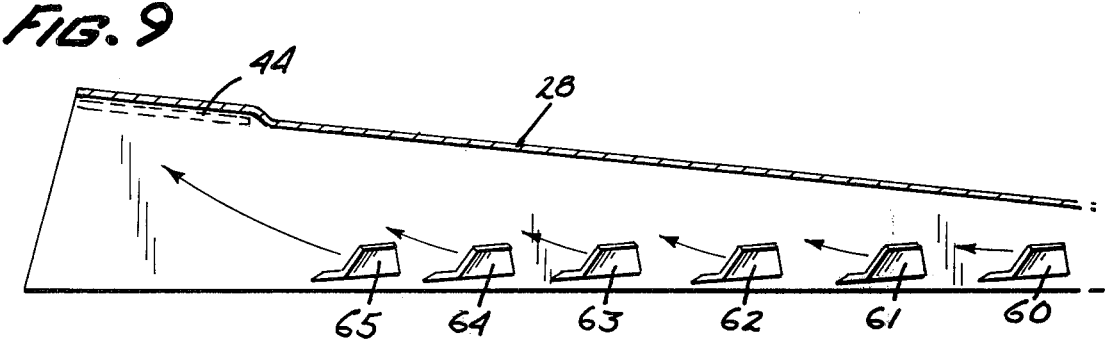
FIG. 9 is a generated view taken from FIG. 8 showing, inter alia, the rise of the expansion portion of the mower housing which enables discharge of cut grass particles through the combined pumping and mechanical throwing effects.

FIGS. 8 and 9 are views which show successive positions of a blade cutting tip for purposes of discussion of suspension and transport phenomena. FIG. 9 is a generated view taken from FIG. 8 in which the expansion top wall of the housing is effectively unwound. In FIG. 8, successive positions of the cutting tip are identified with reference numerals 60 through 65 respectively. Taking a circle defined by the rotation of the cutting blade, cutting of grass particles occurs in the front two quadrants of the circle defined by rotation of the cutting blade about its driven axis. A number of trajectories of grass particles are shown. For example, the trajectory of the particles from cutting tip 60 is initially substantially inward from a tangential line. However, the particles eventually gather toward the outer edge of the top expansion wall and are carried by pneumatic transport generated by an axial flow pumping effect created by the blade and continuous housing side wall along the outside upper edge of the expansion area of the housing to the discharge opening. In providing this pumping action insert 27 is particulary important, since it provides side wall continuity therefore enabling a substantially greater axial pumping effect. It should be understood that for grass cut in successive positions 61, 62, 63, 64 and 65 there is less need for pneumatic transport since cutting occurs closer to the discharge opening and less angular redirection of cut particles is required. Also, the substantial rise of the expansion top wall shown particularly in FIG. 9, aids in enabling grass cut on the same half of the housing as the discharge opening to rise more sharply and be transported into the bag with a high trajectory.

It is believed that it is the combination of this inward upward mechanical throwing action of the sail, which suspends and transports cut grass particles, with pneumatic flow which aids transport that enables the mower of the present invention to achieve rear discharge and bagging despite a relatively low cutting blade tip speed.

It should be stressed that it is not claimed that mere use of a trailing sail alone or use of a symmetrical expansion type housing or the use of a sail with an inward rake are in themselves the invention. What has been accomplished here is the development of a mower with a combined mechanical throwing and pneumatic transport action in which a combination of certain important features regarding the configuration of the trailing sail portion of the cutting blade in combination with features of the housing allows construction of a rotary mower which operates in a low speed range to provide a rotary mower which will be useable in a rear discharge bagging mode.

From the foregoing, it should be apparent that a low speed rotary mower overcoming the shortcomings and disadvantages of prior art rotary mowers has been provided. The invention has been described in the specification in conjunction with specific embodiments thereof. However, it is evident that a number of alternatives and modifications will be apparent to persons skilled in the art after a reading of the foregoing description. Accordingly, it is intended to embrace all such alternatives, modifications and variations falling within the spirit and broad scope of the appended claims.

What is claimed is:

1. Rotary mowing and bagging apparatus, comprising, in combination:
    a. a cutting blade mounted for rotation about a substantially vertical axis, said blade having a pair of cutting tips at opposite ends thereof, with each tip including a leading cutting edge and a trailing sail portion having a front surface thereon, each of said front surfaces being inwardly raked at an angle in the range of 25° to 60° with respect to a line parallel to a radial line from said axis of blade rotation, said front surfaces each having an upward rake angle in the range of 18° to 35°, said upward rake angle being defined as the angle between said front surface and a line perpendicular to a cutting plane defined by rotation of said cutting edges about said axis;
    b. a mower housing in which said blade is mounted, having an expansion portion with an expansion top wall with a substantial rise therein leading to a discharge opening, said housing also having a continuous exterior side wall surrounding said blade at the height thereof and extending above said sail portions;
    c. means for rotatably driving said blade at a tip speed in the range of 5,000 FPM — 14,000 FPM;
    d. front and rear wheels mounted on said housing to enable movement of said mower over a ground surface at a controlled height thereabove; and
    e. a grass-catching bag attached to said housing at said discharge opening.

2. The structure of claim 1 wherein said discharge opening is vertically spaced entirely above said sail portions and the top wall of said discharge opening is an extension of said expansion top wall.

3. The structure of claim 2 wherein said expansion top wall defines a circular helix in form having a vertical rise of at least 6 inches in its extent about said housing.

4. The structure of claim 2 wherein said continuous exterior side wall defines essentially a circular cylinder in shape.

5. The structure of claim 4 wherein the vertical axis of rotation of said blade is rearwardly offset from the axis of said circular cylinder and the clearance between said blade tip and said housing in the rear two quadrants of blade rotation does not exceed 3/16 inch.

6. The structure of claim 5 wherein said expansion top wall has an angular rise of at least 20° with respect to said cutting plane.

7. The structure of claim 5, wherein said cutting blade is mounted with respect to said front and rear wheels so that the clearance between said ground surface and said blade tips in the front two quadrants of blade rotation is less than the clearance in the rear two quadrants of blade rotation; and each of said blade tips have a body portion between said cutting edge and said trailing sail portion, said body portions each being formed at an angle upward with respect to said cutting plane whereby repeated contact between said body portions and the tips of cut blades of grass may be avoided.

8. In combination in a rotary lawn mower:
a. a mower housing having a cutting region thereof with a continuous closed vertical side wall, and a transport and discharge region spaced above said cutting region and defining a channel extending circumferentially about said housing, said channel having a top wall of progressively increasing height generally defining a circular helix in form and terminating at a discharge opening in said housing, said discharge opening being positioned entirely vertically above said cutting region;
b. a cutting blade mounted for rotation about a nearly vertical axis within said cutting region, said blade having a pair of leading cutting edges thereon;
c. mechanical throwing means defining impact surfaces trailing said cutting edges and rotating therewith to impact grass particles severed by said edges and direct said particles inward and upward into said transport and discharge region, said impact surfaces being located entirely within said cutting region and having a substantial upward rake with respect to the cutting plane defined by rotation of said cutting edges about said axis, and having an upward rake angle greater that 0°, said upward rake angle being defined as the angle said impact surfaces are laid back from a line perpendicular to the cutting plane, said impact surfaces also having substantial inward rake;
d. means rotatably driving said mower at a cutting edge speed in the range of 5,000 to 14,000 FPM; and
e. pumping means rotating with said blade and combining with said vertical side wall for drawing air inwardly around the bottom edge thereof and pumping said air circumferentially and axially to said discharge opening by means of said channel to aid in transport of said particles.

9. The structure of claim 8 wherein said mechanical throwing means and pumping means comprise a pair of sail portions trailing said cutting edges, said impact surfaces comprising front surfaces on each of said sail portions, said front surfaces being directed inwardly and upwardly to promote substantial upward flow of said air and grass particles with respect to said blade.

10. The structure of claim 9 wherein said front surfaces form an angle of between 25° and 60° with respect to a line parallel to a radial line from said axis of rotation.

11. The structure of claim 10 wherein the front surface of said sail portions are upwardly raked at an angle in the range of 18° to 35°, the angle of upward rake being defined as the angle between said front surfaces and a line parallel to the blade axis of rotation.

12. The structure of claim 10 wherein said sail portions have front surfaces with a vertical height of at least one half inch.

* * * * *